United States Patent
Figueroa et al.

(10) Patent No.: US 9,337,750 B2
(45) Date of Patent: May 10, 2016

(54) POWER CONVERSION APPARATUS

(71) Applicant: TOSHIBA MITSUBISHI-ELECTRIC INDUSTRIAL SYSTEMS CORPORATION, Minato-ku, Tokyo (JP)

(72) Inventors: Ruben Alexis Inzunza Figueroa, Tokyo (JP); Eiichi Ikawa, Tokyo (JP); Takeshi Sumiya, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 234 days.

(21) Appl. No.: 13/973,645

(22) Filed: Aug. 22, 2013

(65) Prior Publication Data

US 2013/0336026 A1 Dec. 19, 2013

Related U.S. Application Data

(63) Continuation of application No. PCT/JP2011/053956, filed on Feb. 23, 2011.

(51) Int. Cl.
| | |
|---|---|
| H02M 5/45 | (2006.01) |
| H02M 5/458 | (2006.01) |
| H02M 5/42 | (2006.01) |
| H02M 7/68 | (2006.01) |
| H02M 3/24 | (2006.01) |
| H02M 7/44 | (2006.01) |
| H02M 7/5395 | (2006.01) |

(Continued)

(52) U.S. Cl.
CPC .............. *H02M 7/5395* (2013.01); *H02J 3/386* (2013.01); *H02M 5/458* (2013.01); *H02M 7/53871* (2013.01); *Y02E 10/763* (2013.01)

(58) Field of Classification Search
CPC ......... H02M 5/40; H02M 5/44; H02M 5/453; H02M 5/458; H02M 5/4585; H02M 7/02; H02M 7/217; H02M 7/42; H02M 7/48; H02M 7/53; H02M 7/537; H02M 7/539; H02M 7/15387; H02M 7/5395; H02M 7/53871; H02J 3/382; H02J 3/383; H02J 3/386; Y02E 10/56; Y02E 10/563; Y02E 10/70; Y02E 10/76; Y02E 10/763
USPC ............ 363/15–17, 34–38, 40–43, 55–56.03, 363/56.05, 95–99, 131–134, 120, 121; 323/205–211, 271–276, 282–285, 323/299–303, 351, 906; 290/43, 44, 52, 54, 290/55; 318/800–803, 807–811
See application file for complete search history.

(56) References Cited

U.S. PATENT DOCUMENTS

| | | |
|---|---|---|
| 6,921,985 B2 | 7/2005 | Janssen et al. |
| 2007/0170885 A1 | 7/2007 | Morimoto et al. |

FOREIGN PATENT DOCUMENTS

| | | |
|---|---|---|
| CN | 1747617 A | 3/2006 |
| CN | 1929277 A | 3/2007 |

(Continued)

OTHER PUBLICATIONS

English translation of Hiroshi (JP 9-37560).*

(Continued)

*Primary Examiner* — Timothy J Dole
*Assistant Examiner* — Carlos Rivera-Perez
(74) *Attorney, Agent, or Firm* — Finnegan, Henderson, Farabow, Garrett & Dunner, LLP (57) ABSTRACT

A power conversion apparatus includes an inverter circuit including a switching element, a system voltage measurement unit measuring a system voltage of a power system, a voltage drop detector detecting a voltage drop of the power system, a carrier wave generator generating a carrier wave, a carrier wave frequency modulator increasing a frequency of the carrier wave, when the voltage drop is detected, a signal wave generator generating a signal wave to control the inverter circuit, a gate signal generator comparing the carrier wave with the signal wave, and generating a gate signal, and a power conversion controller controlling the inverter circuit, based on the gate signal.

15 Claims, 4 Drawing Sheets

(51) Int. Cl.
*H02J 3/38* (2006.01)
*H02M 7/5387* (2007.01)

(56) References Cited

FOREIGN PATENT DOCUMENTS

| | | |
|---|---|---|
| JP | 9-37560 | 2/1997 |
| JP | 2006-238610 | 9/2006 |

OTHER PUBLICATIONS

English-language International Search Report from Japanese Patent Office for International Application No. PCT/JP2011/053956, mailed May 17, 2011.
Office Action from Chinese Patent Office for Chinese Patent Application No. 2011800682664, mailed Feb. 16, 2015.
International Preliminary Report on Patentability and Written Opinion issued by The International Bureau of WIPO on Sep. 6, 2013.

* cited by examiner

POWER CONVERSION APPARATUS

CROSS REFERENCE TO RELATED APPLICATIONS

This application is a Continuation Application of PCT Application No. PCT/JP2011/053956, filed Feb. 23, 2011, the entire contents of which are incorporated herein by reference.

BACKGROUND OF THE INVENTION

1. Field of the Invention

The invention relates to a power conversion apparatus to be applied to a generation system which interconnects with an alternating current power system.

2. Description of the Related Art

In general, a power conversion apparatus is used in a generation system which interconnects with an alternating current (AC) power system. The power conversion apparatus converts a direct current (DC) power into an AC power which synchronizes with the AC power system, to supply the power to the AC power system. Moreover, on an AC output side of the power conversion apparatus, an overcurrent relay is disposed to protect the power conversion apparatus.

However, the overcurrent relay for use in this way performs the following false operation sometimes. When a system voltage drops owing to a fault or the like of the AC power system, an amplitude of a ripple of an alternating current output from the power conversion apparatus increases. In consequence, even when an instantaneous value of a current of a fundamental component is not in excess of a setting value at which the overcurrent relay operates, the instantaneous value due to the amplitude of the ripple of the current exceeds the setting value, so that the overcurrent relay operates sometimes. In this case, the overcurrent relay is to bring about a false operation.

CITATION LIST

Patent Literature

Patent Literature 1: U.S. Pat. No. 6,921,985

BRIEF SUMMARY OF THE INVENTION

An object of the invention is to provide a power conversion apparatus to be applied to a generation system which interconnects with an AC power system, so that a false operation of an overcurrent relay disposed on an AC output side can be prevented.

In accordance with an aspect of the invention, there is provided a power conversion apparatus to be applied to a generation system that interconnects with an alternating current power system. The power conversion apparatus includes an inverter circuit including a switching element configured to convert a direct current power into an alternating current power; a system voltage measurement unit configured to measure a system voltage of the alternating current power system; a voltage drop detector configured to detect a voltage drop of the alternating current power system, based on the system voltage measured by the system voltage measurement unit; a carrier wave generator configured to generate a carrier wave; a carrier wave frequency modulator configured to increase a frequency of the carrier wave generated by the carrier wave generator, when the voltage drop is detected by the voltage drop detector; a signal wave generator configured to generate a signal wave to control the alternating current power output from the inverter circuit; a gate signal generator configured to compare the carrier wave generated by the carrier wave generator with the signal wave generated by the signal wave generator, and to generate a gate signal to drive the switching element; and a power conversion controller configured to perform power conversion control of the inverter circuit by pulse width modulation, based on the gate signal generated by the gate signal generator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be described with reference to the drawings.

First Embodiment

Figure 1:
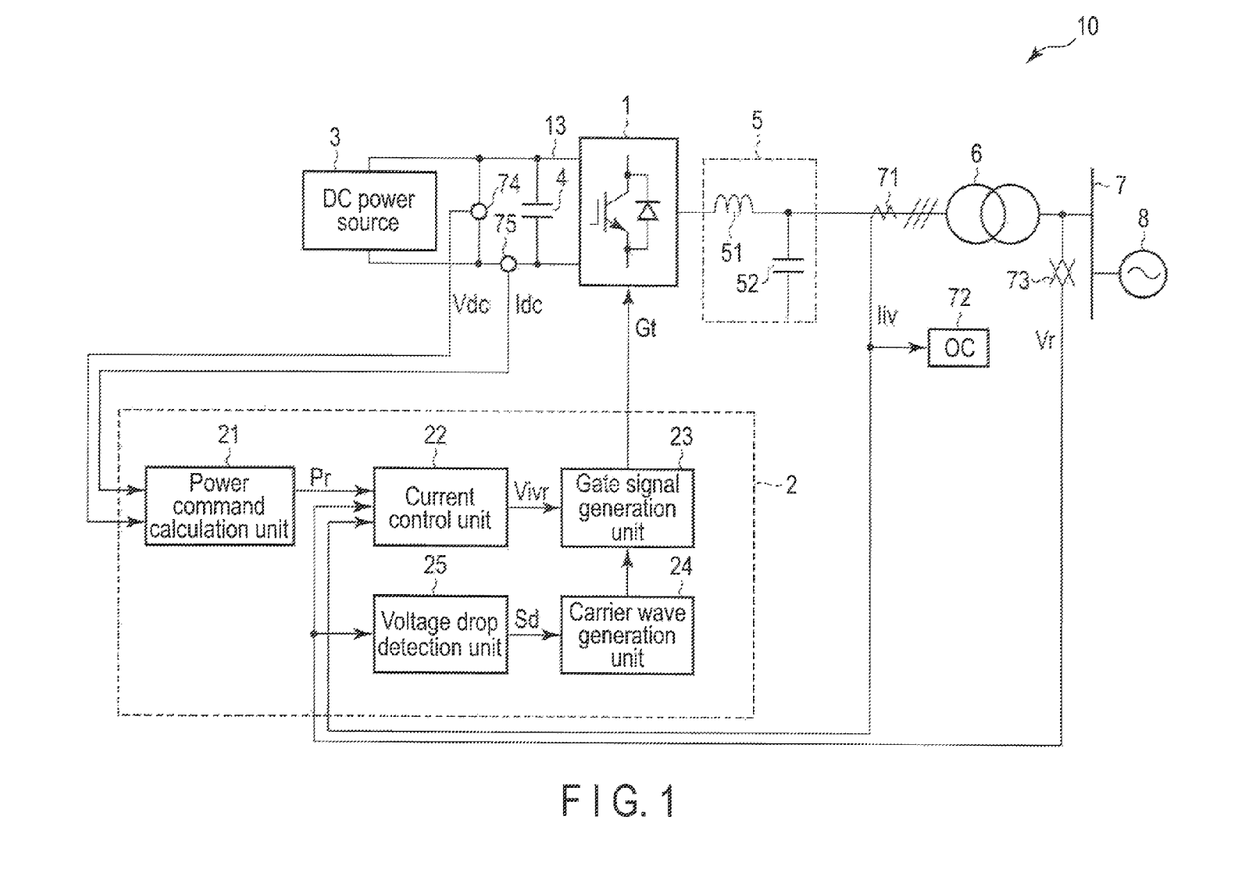
FIG. 1 is a block diagram showing a constitution of a dispersed generation system to which a control apparatus of an inverter according to a first embodiment of the invention is applied.

FIG. 1 is a block diagram showing a constitution of a dispersed generation system 10 to which a control apparatus 2 of an inverter 1 according to a first embodiment of the invention is applied. It is to be noted that the same parts as in the drawings are denoted with like reference signs to omit detailed description of the parts, and different parts will mainly be described. Also in the subsequent embodiments, repeated descriptions are similarly omitted.

The dispersed generation system 10 comprises the inverter 1, the control apparatus 2, a DC power source 3, a smoothing capacitor 4, an AC filter 5, an interconnection transformer 6, an AC current detector 71, an overcurrent relay 72, an AC voltage detector 73, and a DC voltage detector 74. The dispersed generation system 10 is a generation system which interconnects with an AC power system including a system bus 7 and an AC power source 8.

The DC power source 3 supplies a DC power to the inverter 1. The DC power source 3 may be any DC power source, as long as the DC power can be supplied to the inverter 1. The DC power source 3 is, for example, a secondary cell, a solar cell, or a fuel cell. It is to be noted that the DC power source 3 may be a converter which converts an AC power into the DC power to supply the power to the inverter 1, or the like.

The inverter 1 is an inverter subjected to pulse width modulation (PWM) control. The inverter 1 converts the DC power supplied from the DC power source 3 into the AC power which synchronizes with the AC power source 8. The inverter 1 supplies the AC power to the system bus 7 connected to the AC power source 8, via the interconnection transformer 6. In the inverter 1, a power conversion circuit (an inverter circuit) is constituted of a switching element. The switching element is driven by a gate signal Gt output from the control apparatus 2. In consequence, the inverter 1 performs the power conversion.

The smoothing capacitor 4 is disposed on a DC side of the inverter 1. The smoothing capacitor 4 smoothes the DC power supplied from the DC power source 3 to the inverter 1.

The AC filter 5 comprises a reactor 51 and a capacitor 52. The AC filter 5 removes a noise output from the inverter 1.

The AC current detector 71 is a detector to measure an output current Iiv of the inverter 1. The AC current detector 71 outputs the detected output current Iiv as a detection signal to the control apparatus 2 and the overcurrent relay 72.

The overcurrent relay 72 performs a protecting operation, when an instantaneous value of the output current Iiv measured by the AC current detector 71 is in excess of a beforehand setting value.

The AC voltage detector 73 is a detector to measure a system voltage Vr of the system bus 7. The AC voltage detector 73 outputs the detected system voltage Vr as a detection signal to the control apparatus 2.

The DC voltage detector 74 is a detector to measure a DC voltage Vdc which is to be applied to the DC side of the inverter 1. The DC voltage detector 74 outputs the detected DC voltage Vdc as a detection signal to the control apparatus 2.

A DC current detector 75 is a detector to measure a direct current Idc which is to be input into the DC side of the inverter 1. The DC current detector 75 outputs a detected direct current Idc as a detection signal to the control apparatus 2.

The control apparatus 2 comprises a power command calculation unit 21, a current control unit 22, a gate signal generation unit 23, a carrier wave generation unit 24, and a voltage drop detection unit 25.

The power command calculation unit 21 calculates a power command value Pr on the basis of the DC voltage Vdc detected by the DC voltage detector 74, and the direct current Idc detected by the DC current detector 75. The power command value Pr is a command value to an output power of the inverter 1. The power command calculation unit 21 outputs the calculated power command value Pr to the current control unit 22.

Into the current control unit 22, there are input the power command value Pr calculated by the power command calculation unit 21, the output current Iiv detected by the AC current detector 71 and the system voltage Vr detected by the AC voltage detector 73. The current control unit 22 is a processing unit to control the output current Iiv so that an output power of the inverter 1 follows the power command value Pr. The current control unit 22 calculates a voltage command value Vivr on the basis of the power command value Pr, the output current Iiv, and the system voltage Vr. The voltage command value Vivr is a command value to the output voltage of the inverter 1. The current control unit 22 outputs the calculated voltage command value Vivr as a signal wave to the gate signal generation unit 23. The signal wave is a sinusoidal wave.

Into the voltage drop detection unit 25, the system voltage Vr detected by the AC voltage detector 73 is input. The voltage drop detection unit 25 outputs a detection signal Sd to the carrier wave generation unit 24 on the basis of the system voltage Vr. The voltage drop detection unit 25 sets the detection signal Sd to "0", when the system voltage Vr is not less than a predetermined reference voltage (usual time). The voltage drop detection unit 25 sets the detection signal Sd to "1", when the system voltage Vr is below the predetermined reference voltage (at the drop of the system voltage Vr).

Into the carrier wave generation unit 24, the detection signal Sd from the voltage drop detection unit 25 is input. Two different frequencies are beforehand set to the carrier wave generation unit 24. When the detection signal Sd is "0" (the usual time), the lower frequency is selected from the two frequencies. When the detection signal Sd is "1" (at the drop of the system voltage), the higher frequency is selected from the two frequencies. The carrier wave generation unit 24 generates a triangular wave as a carrier wave at the frequency selected in accordance with the detection signal Sd. The carrier wave generation unit 24 outputs the generated carrier wave to the gate signal generation unit 23.

Next, there will be described a method of determining the frequency of the carrier wave for use at the drop of the system voltage Vr.

A current ripple to be superimposed on the output current Iiv of the inverter 1 is generated in accordance with the following equation.

$$di/dt = \Delta V/L \qquad (1),$$

in which the left side is a change ratio of the output current Iiv of the inverter 1. L is a reactor component between the inverter 1 and the system bus 7. $\Delta V$ is a voltage drop of the system voltage Vr.

The frequency of the carrier wave is set so that the current ripple predicted in accordance with the above equation is suppressed.

Into the gate signal generation unit 23, there are input the voltage command value Vivr calculated by the current control unit 22 and the carrier wave generated by the carrier wave generation unit 24. The gate signal generation unit 23 compares the sinusoidal wave which is the signal wave with the triangular wave which is the carrier wave, to generate a pulse wave. The gate signal generation unit 23 outputs the generated pulse wave as the gate signal Gt to the inverter 1. The gate signal Gt drives the switching element of the inverter 1. In consequence, the output voltage of the inverter 1 is controlled.

According to the present embodiment, when the system voltage of the interconnecting power system drops, the gate signal Gt is generated with the carrier wave of the high frequency. In consequence, an amplitude of the ripple of the current output from the inverter 1 can be decreased.

Moreover, when the carrier wave is set to the high frequency only at the drop of the system voltage Vr, a failure ratio of the switching element of the inverter 1 can be decreased, as compared with a case where a carrier wave always having the high frequency is used.

Second Embodiment

Figure 2:
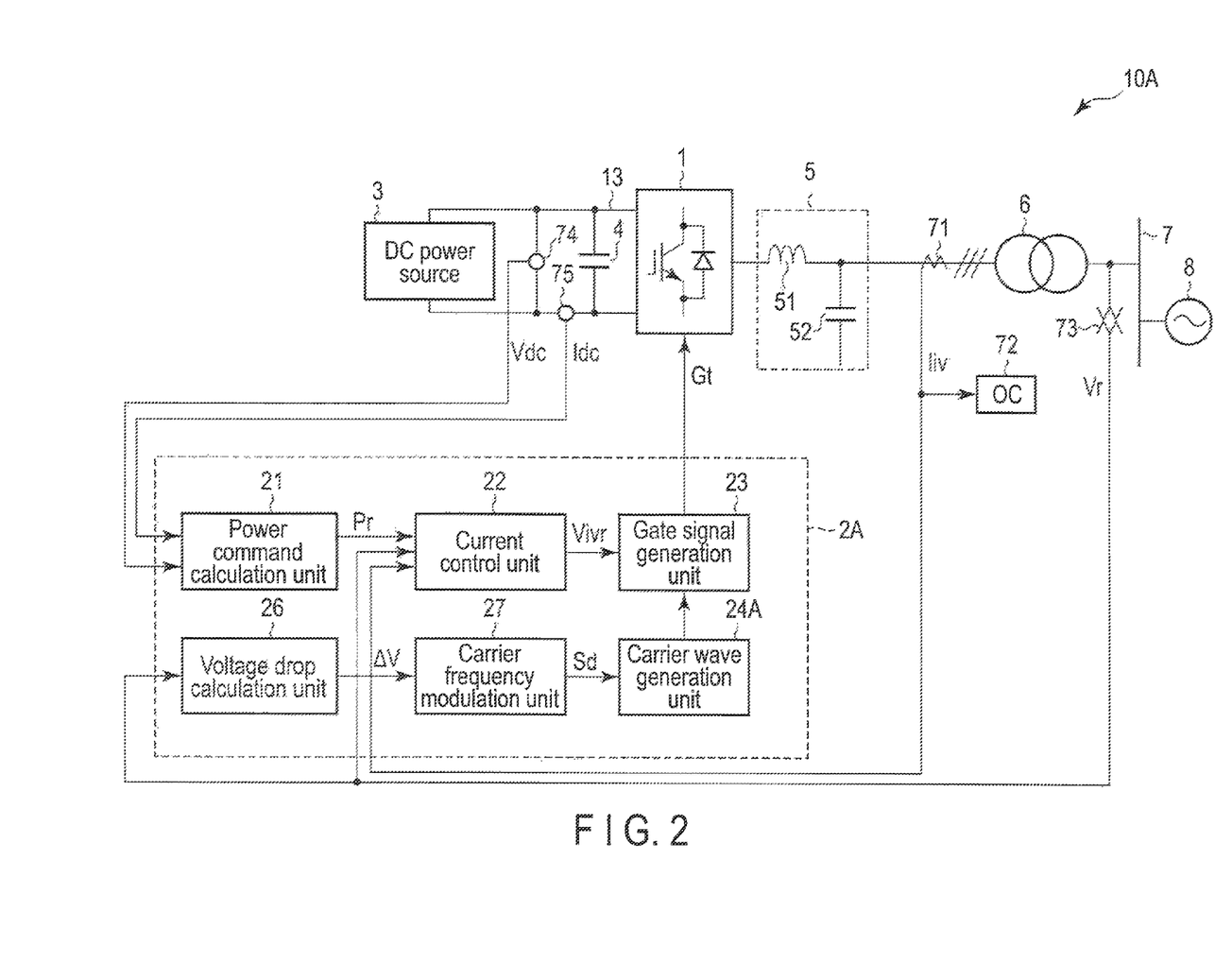
FIG. 2 is a block diagram showing a constitution of a dispersed generation system to which a control apparatus of an inverter according to a second embodiment of the invention is applied.

FIG. 2 is a block diagram showing a constitution of a dispersed generation system 10A to which a control apparatus 2A of the inverter 1 according to a second embodiment of the invention is applied.

The dispersed generation system 10A has a constitution where in the dispersed generation system 10 according to the first embodiment shown in FIG. 1, the control apparatus 2 is replaced with the control apparatus 2A. The other respects are similar to those of the dispersed generation system 10 according to the first embodiment.

The control apparatus 2A has a constitution where in the control apparatus 2 according to the first embodiment, the carrier wave generation unit 24 is replaced with a carrier wave generation unit 24A, and the voltage drop detection unit 25 is replaced with a voltage drop calculation unit 26 and a carrier frequency modulation unit 27. The other respects are similar to those of the control apparatus 2 according to the first embodiment.

Into the voltage drop calculation unit 26, the system voltage Vr detected by the AC voltage detector 73 is input. When the system voltage Vr is below a predetermined reference voltage (at the drop of the system voltage), the voltage drop calculation unit 26 calculates a voltage drop $\Delta V$ by subtracting the system voltage Vr from a rated voltage. The voltage drop calculation unit 26 outputs the calculated voltage drop $\Delta V$ to the carrier frequency modulation unit 27.

Into the carrier frequency modulation unit 27, the voltage drop $\Delta V$ calculated by the voltage drop calculation unit 26 is input. The carrier frequency modulation unit 27 calculates a frequency command value fr on the basis of the voltage drop $\Delta V$. The frequency command value fr is calculated so that the value increases as the voltage drop $\Delta V$ increases. The carrier frequency modulation unit 27 outputs the calculated frequency command value fr to the carrier wave generation unit 24A.

An equation with which the frequency command value fr is calculated on the basis of the voltage drop $\Delta V$ is derived similarly to the first embodiment.

The carrier wave generation unit 24A modulates the frequency of a carrier wave so that the frequency becomes the frequency command value fr calculated by the carrier frequency modulation unit 27. The carrier wave generation unit 24A generates the carrier wave at the frequency modulated to the frequency command value fr. The carrier wave generation unit 24A outputs the generated carrier wave to the gate signal generation unit 23. The other respects are similar to those of the carrier wave generation unit 24 according to the first embodiment.

According to the present embodiment, the frequency of the carrier wave is modulated in accordance with the voltage drop $\Delta V$, so that the carrier wave can be generated at such a minimum frequency that an overcurrent relay 72 is not operated. In consequence, the frequency is not increased more than necessary, and hence a failure ratio of a switching element of the inverter 1 can be decreased as compared with the first embodiment.

Third Embodiment

Figure 3:
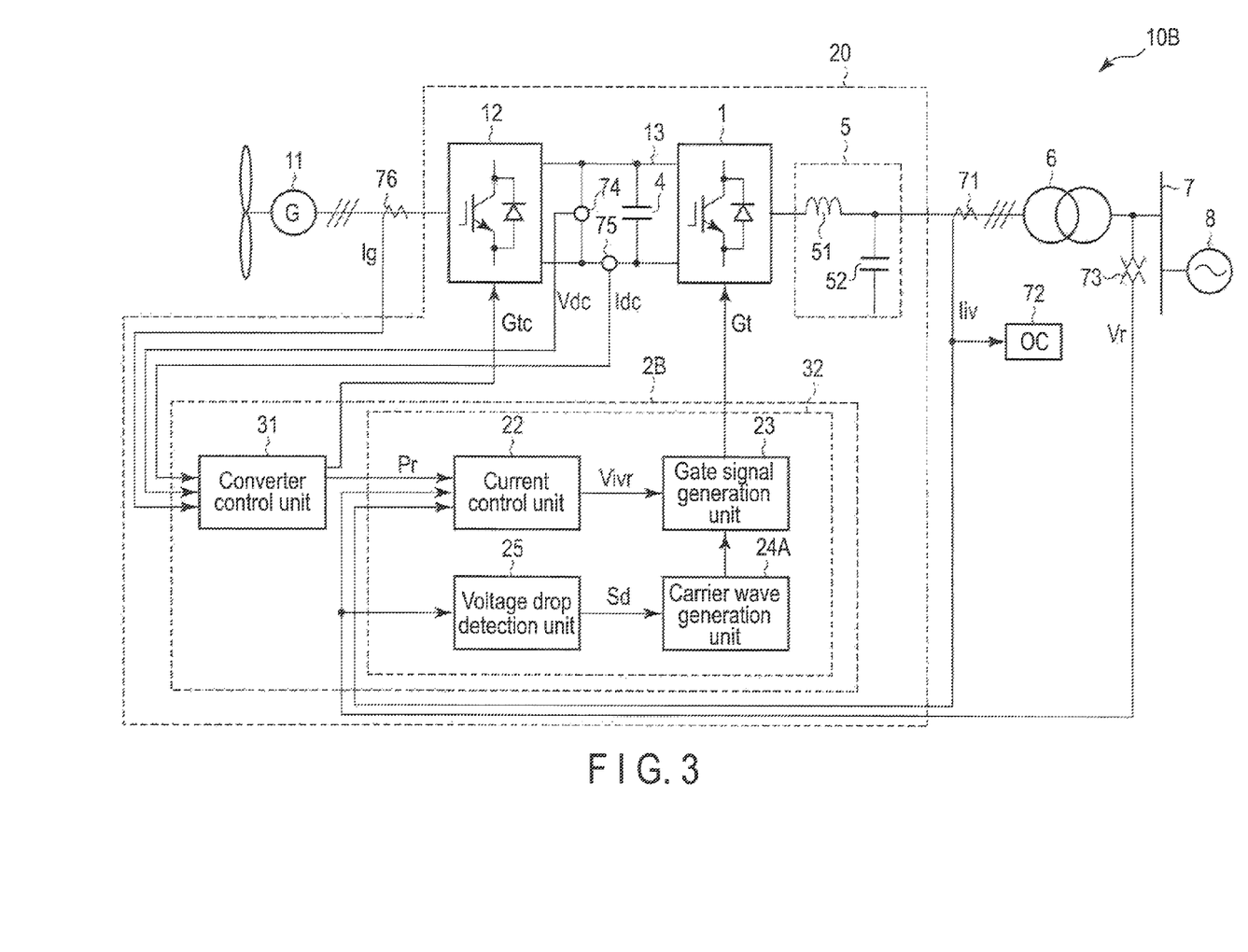
FIG. 3 is a block diagram showing a constitution of a dispersed generation system to which a power conditioner of a wind power generation system according to a third embodiment of the invention is applied.

FIG. 3 is a block diagram showing a constitution of a dispersed generation system 10B to which a power conditioner 20 of a wind power generation system according to a third embodiment of the invention is applied.

The dispersed generation system 10B has a constitution where in the dispersed generation system 10 according to the first embodiment shown in FIG. 1, the control apparatus 2 is replaced with a control apparatus 2B, the DC power source 3 is replaced with a wind power generator 11 and a converter 12, and an AC current detector 76 is added. The power conditioner 20 has a constitution including the inverter 1, the converter 12, the control apparatus 2B, the smoothing capacitor 4, and the AC filter 5. The other respects are similar to those of the dispersed generation system 10 according to the first embodiment.

The wind power generator 11 is a generator to generate an AC power by use of a wind power. The wind power generator 11 supplies the generated AC power to the power conditioner 20.

The power conditioner 20 is a power conversion apparatus to convert the AC power supplied from the wind power generator 11 into the AC power which synchronizes with a system voltage Vr. The power conditioner 20 supplies the converted AC power to the system bus 7 via the interconnection transformer 6.

A DC side of the converter 12 is connected to a DC side of the inverter 1 via a DC link 13. That is, the converter 12 and the inverter 1 constitute a back to back (BTB) converter. An AC side of the converter 12 is connected to the wind power generator 11. The converter 12 converts the AC power generated by the wind power generator 11 into a DC power, to supply the power to the inverter 1.

The converter 12 is an inverter subjected to PWM control. In the converter 12, a power conversion circuit is constituted of a switching element. The switching element is driven by a gate signal Gt output from a converter control unit 31 of the control apparatus 2B. In consequence, the converter 12 performs the power conversion.

The control apparatus 2B has a constitution where in the control apparatus 2 according to the first embodiment, the converter control unit 31 is disposed in place of the power command calculation unit 21. An inverter control unit 32 is constituted of the current control unit 22, the gate signal generation unit 23, the carrier wave generation unit 24, and the voltage drop detection unit 25. The other respects are similar to those of the control apparatus 2 according to the first embodiment.

The AC current detector 76 is a detector to measure an alternating current Ig which is to be input from the wind power generator 11 into the converter 12. The AC current detector 76 outputs the detected alternating current Ig as a detection signal to the converter control unit 31.

Into the converter control unit 31, there are input the alternating current Ig detected by the AC current detector 76, the DC voltage Vdc detected by the DC voltage detector 74, and the direct current Idc detected by the DC current detector 75.

The converter control unit 31 generates a gate signal Gtc to control the converter 12, on the basis of the alternating current Ig detected by the AC current detector 76, the DC voltage Vdc detected by the DC voltage detector 74, and the direct current Idc detected by the DC current detector 75. The converter control unit 31 outputs the generated gate signal Gtc, to drive the switching element of the converter 12. In consequence, an output power of the converter 12 is controlled.

The converter control unit 31 calculates a power command value Pr to control the inverter 1. The converter control unit 31 outputs the calculated power command value Pr to the current control unit 22.

According to the present embodiment, in the power conditioner 20 of the wind power generation system, a function and an effect similar to those of the first embodiment can be obtained.

Fourth Embodiment

Figure 4:
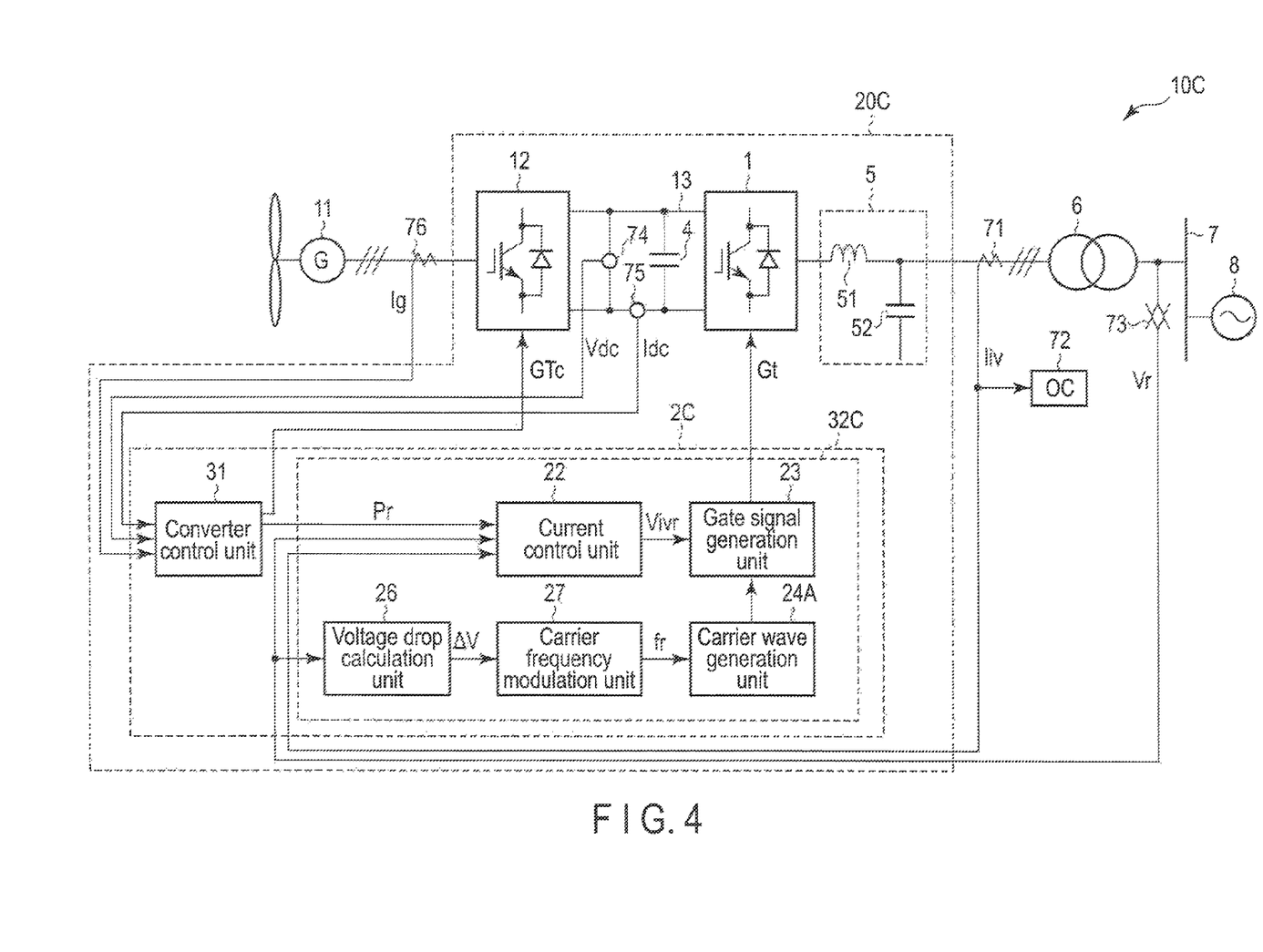
FIG. 4 is a block diagram showing a constitution of a dispersed generation system to which a power conditioner of a wind power generation system according to a fourth embodiment of the invention is applied.

FIG. 4 is a block diagram showing a constitution of a dispersed generation system 10C to which a power conditioner 20C of a wind power generation system according to a fourth embodiment of the invention is applied.

The dispersed generation system 10C has a constitution where in the dispersed generation system 10B according to the third embodiment shown in FIG. 3, the power conditioner 20 is replaced with the power conditioner 20C. The other respects are similar to those of the dispersed generation system 10B according to the third embodiment.

The power conditioner 20C has a constitution where in the control apparatus 2B of the power conditioner 20 according to the third embodiment, the carrier wave generation unit 24 is replaced with the carrier wave generation unit 24A according to the second embodiment, and the voltage drop detection unit 25 is replaced with the voltage drop calculation unit 26 according to the second embodiment and the carrier frequency modulation unit 27 according to the second embodiment. The other respects are similar to those of the power conditioner 20 according to the third embodiment.

According to the present embodiment, in the power conditioner 20C of the wind power generation system, a function and an effect similar to those of the second embodiment can be obtained.

It is to be noted that in the second embodiment and the fourth embodiment, the frequency of the carrier wave is modulated to the frequency command value fr calculated on the basis of the voltage drop ΔV, but the frequency may be selected from beforehand set frequencies. When the frequency corresponding to the voltage drop ΔV is selected, a function and an effect similar to those of the respective embodiments can be obtained.

Moreover, in the third embodiment and the fourth embodiment, the constitution using the wind power generator 11 has been described, but the invention is not limited to this constitution. The generator may be a generator (for example, a hydroelectric power generator) which uses energy other than the wind power, as long as the generator generates the AC power.

Furthermore, in the respective embodiments, the frequency of the carrier wave and an equation to obtain this frequency may not be based on the above equation (1). For example, the frequency of the carrier wave may be obtained by empirical rule or know-how.

Moreover, in the respective embodiments, the interconnection transformer 6 interposed between the dispersed generation system 10 and the AC power system may not be disposed. In this case, the voltage detected by the AC voltage detector 73 is an electricity at the same measuring position as that of the current detected by the AC current detector 71.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A power conversion apparatus to be applied to a generation system that interconnects with an alternating current power system, the power conversion apparatus comprising:
    an inverter circuit including a switching element configured to convert a direct current power into an alternating current power;
    a system voltage measurement unit configured to measure a system voltage of the alternating current power system;
    a voltage drop detector configured to detect a voltage drop of the alternating current power system, based on the system voltage measured by the system voltage measurement unit;
    a carrier wave generator configured to generate a carrier wave;
    a carrier wave frequency modulator configured to increase a frequency of the carrier wave generated by the carrier wave generator such that a ripple of a current output from the inverter circuit does not exceed a setting value of an overcurrent relay provided on an output side of the inverter circuit, when the voltage drop is detected by the voltage drop detector;
    a signal wave generator configured to generate a signal wave to control the alternating current power output from the inverter circuit;
    a gate signal generator configured to compare the carrier wave generated by the carrier wave generator with the signal wave generated by the signal wave generator, and to generate a gate signal to drive the switching element; and
    a power conversion controller configured to perform power conversion control of the inverter circuit by pulse width modulation, based on the gate signal generated by the gate signal generator.

2. The power conversion apparatus according to claim 1, wherein the carrier wave frequency modulator selects, from set frequencies, a frequency which increases, when the voltage drop is detected by the voltage drop detector.

3. The power conversion apparatus according to claim 2, further comprising:
    a direct current power source configured to supply the direct current power to the inverter circuit.

4. The power conversion apparatus according to claim 2, further comprising:
    an alternating current power source configured to supply the alternating current power; and
    a converter circuit configured to convert the alternating current power supplied from the alternating current power source into the direct current power, to supply the direct current power to the inverter circuit.

5. The power conversion apparatus according to claim 1, wherein the carrier wave frequency modulator determines a frequency in accordance with the voltage drop, when the voltage drop is detected by the voltage drop detector.

6. The power conversion apparatus according to claim 5, further comprising:
    a direct current power source configured to supply the direct current power to the inverter circuit.

7. The power conversion apparatus according to claim 5, further comprising:
    an alternating current power source configured to supply the alternating current power; and
    a converter circuit configured to convert the alternating current power supplied from the alternating current power source into the direct current power, to supply the direct current power to the inverter circuit.

8. The power conversion apparatus according to claim 1, further comprising:
    a direct current power source configured to supply the direct current power to the inverter circuit.

9. The power conversion apparatus according to claim 1, further comprising:
    an alternating current power source configured to supply the alternating current power; and
    a converter circuit configured to convert the alternating current power supplied from the alternating current power source into the direct current power, to supply the direct current power to the inverter circuit.

10. A control apparatus for a power conversion apparatus that controls the power conversion apparatus to be applied to a generation system which interconnects with an alternating current power system and containing an inverter circuit including a switching element which converts a direct current power into an alternating current power, the control apparatus comprising:
- a system voltage measurement unit configured to measure a system voltage of the alternating current power system;
- a voltage drop detector configured to detect a voltage drop of the alternating current power system, based on the system voltage measured by the system voltage measurement unit;
- a carrier wave generator configured to generate a carrier wave;
- a carrier wave frequency modulator configured to increase a frequency of the carrier wave generated by the carrier wave generator such that a ripple of a current output from the inverter circuit does not exceed a setting value of an overcurrent relay provided on an output side of the inverter circuit, when the voltage drop is detected by the voltage drop detector;
- a signal wave generator configured to generate a signal wave to control the alternating current power output from the inverter circuit;
- a gate signal generator configured to compare the carrier wave generated by the carrier wave generator with the signal wave generated by the signal wave generator, and to generate a gate signal to drive the switching element; and
- a controller configured to control the inverter circuit by pulse width modulation, based on the gate signal generated by the gate signal generator.

11. The control apparatus for the power conversion apparatus according to claim 10,
wherein the carrier wave frequency modulator selects, from set frequencies, a frequency which increases, when the voltage drop is detected by the voltage drop detector.

12. The control apparatus for the power conversion apparatus according to claim 10,
wherein the carrier wave frequency modulator determines a frequency in accordance with the voltage drop, when the voltage drop is detected by the voltage drop detector.

13. A control method for a power conversion apparatus that controls the power conversion apparatus to be applied to a generation system which interconnects with an alternating current power system and containing an inverter circuit including a switching element which converts a direct current power into an alternating current power, the control method comprising:
- measuring a system voltage of the alternating current power system;
- detecting a voltage drop of the alternating current power system, based on the measured system voltage;
- generating a carrier wave;
- increasing a frequency of the carrier wave such that a ripple of a current output from the inverter circuit does not exceed a setting value of an overcurrent relay provided on an output side of the inverter circuit, when the voltage drop is detected;
- generating a signal wave to control the alternating current power output from the inverter circuit;
- comparing the generated carrier wave with the generated signal wave, and generating a gate signal to drive the switching element; and
- controlling the inverter circuit by pulse width modulation, based on the generated gate signal.

14. The control method for the power conversion apparatus according to claim 13,
wherein the frequency of the carrier wave is selected to increase from set frequencies, when the voltage drop is detected.

15. The control method for the power conversion apparatus according to claim 13,
wherein the frequency of the carrier wave is determined in accordance with the voltage drop, when the voltage drop is detected.

* * * * *